United States Patent
Johnsen et al.

(10) Patent No.: US 8,425,654 B2
(45) Date of Patent: Apr. 23, 2013

(54) PURIFICATION PROCESS FOR $^{153}$GD PRODUCED IN NATURAL EUROPIUM TARGETS

(75) Inventors: Amanda M. Johnsen, Richland, WA (US); Chuck Z. Soderquist, Benton City, WA (US); Bruce K. McNamara, Richland, WA (US); Darrell R. Fisher, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 8 days.

(21) Appl. No.: 13/212,711

(22) Filed: Aug. 18, 2011

(65) Prior Publication Data

US 2012/0042748 A1     Feb. 23, 2012

Related U.S. Application Data

(60) Provisional application No. 61/374,922, filed on Aug. 18, 2010.

(51) Int. Cl.
*C22B 4/04* (2006.01)
*C22B 59/00* (2006.01)

(52) U.S. Cl.
USPC ............... 75/393; 423/2; 423/21.1; 423/21.5; 75/743

(58) Field of Classification Search ............ 75/743, 75/393
See application file for complete search history.

(56) References Cited

U.S. PATENT DOCUMENTS 6,245,305 B1     6/2001     Bray et al.

FOREIGN PATENT DOCUMENTS

EP     0173484 A2     3/1986

OTHER PUBLICATIONS

S. Shinoda et al. In situ generation of fluorescent macrocylic europium (II) complexes via zinc reduction, Journal of Alloys and Compounds, 2009, vol. 488, p. 603-605.*
Y. Chen et al. Anion exchange separation of rare earths in methanol-nitric acid mixed solutions. I. Study on the distribution coefficients and column elution method, J. Chinese. Chem. Soc., 1972, vol. 19, p. 93-102.*
K. Rabie et al. Europium separation from a middle rare earths concentrate derived from Egyptian black sand monazite, Hydrometallurgy, 2007, vol. 86, p. 121-130.*
M. I. Rucandio, Cation-exchange isolation and ICP-AES determination of rare earth elements in geological silicate materials, Fresenius J Anal Chem, 1997, vol. 357, p. 661-669.*
Preston, J. S., et al., The Separation of Europium from a Middle Rare Earth Concentrate by Combined Chemical Reduction, Precipitation, and Solvent Extraction Methods, J. Chem. Technol. Biotechnol., 1998, 65, 93-101.

(Continued)

*Primary Examiner* — Roy King
*Assistant Examiner* — Xiaowei Su
(74) *Attorney, Agent, or Firm* — Derek H. Maughan; James D. Matheson

(57) ABSTRACT

An alteration of the traditional zinc/zinc-amalgam reduction procedure which eliminates both the hazardous mercury and dangerous hydrogen gas generation. In order to avoid the presence of water and hydrated protons in the working solution, which can oxidize $Eu^{2+}$ and cause hydrogen gas production, a process utilizing methanol as the process solvent is described. While methanol presents some flammability hazard in a radiological hot cell, it can be better managed and is less of a flammability hazard than hydrogen gas generation.

4 Claims, 1 Drawing Sheet

OTHER PUBLICATIONS

Schwantes, J. M., et al., Applications of solvent extraction in the high-yield multi-process reduction/separation of Eu from excess Sm, J. Radioanal. Nucl. Chem. Art, 2008, 276 (2), 543-548.

Kim, E. H., et al., A Study on the Photo-reductive Precipitation Rate of Europium Sulfate from Rare Earth Mixture by Addition of Hydrogen Peroxide, Korean J. Chem, Eng., 2002, 19 (2), 305-308.

Selin, D. L., et al., γ-Induced Reduction of Eu(III) In Aqueous Solution, React. Kinet. Catal. Lett., 1989, 39 (2), 273-278.

Mel' Nik, M. I., et al., Methods for Production, Recovery, and Purification of Gadolinium-153, Radiochemistry, 1995, 37 (2), 142-155.

Jelinek, L., et al., Selective Eu(III) Electro-Reduction and Subsequent Separation of Eu(II) from Rare Earths (III) via HDEHP Impregnated Resin, Solvent Extraction and Ion Exchange, 2007, 25, 503-513.

Peppard, D. F., et al., Comparitive Liquid-Liquid Extraction Behaviour of Europium (II) and Europium (III), J. Inorg. Nucl. Chem., 1962, 24, 429-439.

Sayed, S. A., Studies on europium separation from a middle rare earth concentrate by in situ zinc reduction technique, Separation and Purification Technology, 2005, 45, 145-154.

Morais, C. A., et al., Recovery of europium by chemikcal reduction of a commercial solution of europium and Godolinium chlorides, Hydrometallurgy, 2001, 60, 247-253.

Quinby, T. C., et al., The Application of Electroreduction of Europium in the Production of Gadolinium-153, ORNL/TM-10284, 1987.

Ramey, D. W., Gadolinium-153 Production at the Oak Ridge National Lboratory, ORNL/TM-10641, 1988.

International Search Report/Written Opinion for International Application No. PCT/US2011/048269, International Filing Date: Aug. 18, 2011, Date of Mailing Nov. 18, 2011.

Elbanowski, M., et al., Preparation of High-Purity Europium Oxide Using Combined Reduction-Ion Exchange Method, Journal of the Less-Common Metals, Elsevier-Sequoia S.A. Lausanne, CH, vol. 112, No. 1-2, Oct. 1, 1985.

\* cited by examiner

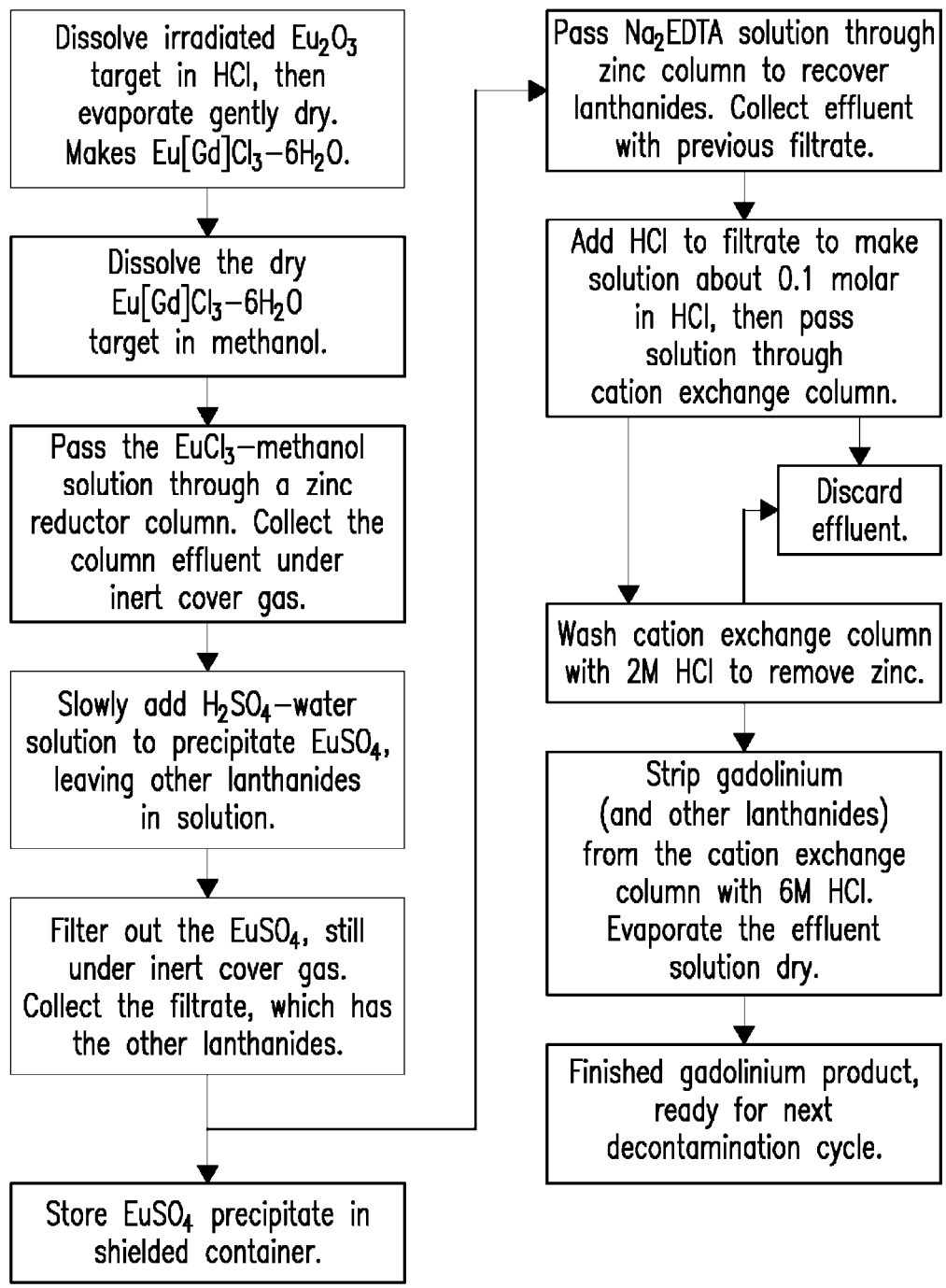

PURIFICATION PROCESS FOR $^{153}$GD PRODUCED IN NATURAL EUROPIUM TARGETS

PRIORITY CLAIM

This application claims priority from U.S. provisional patent application No. 61/374,922 filed Aug. 18, 2010. The contents of which are hereby incorporated in their entirety.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

1. Field of the Invention

The invention generally relates to radiochemical processing and more particularly to a process for processing radiochemical materials for medical applications.

2. Background Information

Several medical and industrial technologies drive worldwide demand for $^{153}$Gd. By far, the largest $^{153}$Gd demand is for Single Photon Emission Computed Tomography, or SPECT, scanners that are used for the diagnosis and monitoring of neurological disorders, cardiac blockages or abnormalities, and primary and metastasized cancer tumors. $^{153}$Gd has also been shown to be a superior tool for localizing lymph nodes during biopsies, and has industrial applications measuring the strength and integrity of structural materials and piping systems.

Determining gamma ray attenuation in the body is difficult due to the presence of multiple organ and tissue types, all of which have different attenuation coefficients. Additionally, these organs and tissues vary in size and density from patient to patient. To correct for these differences, the transmission of gamma rays through the patient from a source of known strength is measured at several angles to provide spatially specific attenuation coefficients for tissues within each patient.

$^{153}$Gd is an isotope for use in such attenuation corrections. $^{153}$Gd decays via electron capture and emits two prominent photons at 97.43 keV and 103.18 keV, which are energetic enough to move through the body of the patient, but expose the patient to as little dose as possible. With a half life of 240.4±1.0 days, $^{153}$Gd is also long-lived enough to be useful in a clinical setting. Beta particles and lower-energy gamma rays and x-rays from $^{153}$Gd are easily blocked with a filter (e.g. copper), and the additional radioactive dose to the patient above that of the in vivo radioisotope is minimal.

$^{153}$Gd is also ideal for localizing sentinel lymph nodes during biopsies. While another radioisotope attached to a tumor-seeking biological marker pinpoints the lymph node in question, a $^{153}$Gd line source is used to determine the physical outline of the patient, allowing the determination of the precise node location for the surgeon. The $^{153}$Gd line source is superior to manual body imaging and a $^{57}$Co-flood source. The commercially available Lixi Profiler® is an example of $^{153}$Gd use in industry. The profiler is a hand-held device that uses $^{153}$Gd gamma rays to non-destructively interrogate wood, rubber, composite materials, welds, and pipe walls for defects or corrosion. It is estimated that the current demand for $^{153}$Gd is approximately 300 Ci per year.

Despite the high demand for $^{153}$Gd in the United States, there has not been a domestic $^{153}$Gd supplier for many years. This in part is due to the problems associated with the existing separation technologies. Because the $^{153}$Gd must be on the order of 99.999% radiochemically pure for medical and industrial applications, extensive chemical processing of the irradiated target is necessary. Additionally, because of the intense radioactivity of the irradiated target, processing must be conducted in radiological hot cells, which have special safety restrictions (e.g. flammability loading) that can limit potential chemical purification methods.

Purification of $^{153}$Gd from an irradiated, natural europium target requires multiple steps, also referred to as "strikes". The first purification step is heavily limited by the intense dose from the radioactive europium isotopes produced during the neutron irradiation. Indeed, the europium activity is so high that separations techniques such as ion exchange and liquid-liquid extraction are usually contraindicated for the first purification step because the organic polymers and solvents suffer substantial radiation-induced degradation and lose efficacy.

Fortunately, a very effective first strike can be implemented by exploiting the solubility difference between Eu(II)SO$_4$ and Ln(III)$_2$(SO$_4$)$_3$, where Ln is the general symbol for an element in the lanthanide series (elements $^{57}$La through $^{71}$Lu, inclusive). Europium is one of a few lanthanides that can be reliably reduced to the Ln$^{2+}$ state while, under the same conditions, gadolinium remains as Ln$^{3+}$. EuSO$_4$ has a $K_{sp}$ on the order of $10^{-6}$ to $10^{-8}$, depending on the background electrolyte, yielding a solubility range of approximately 0.25 to 0.025 g/L. Eu$_2$(SO$_4$)$_3$, Gd$_2$(SO$_4$)$_3$, and Sm$_2$(SO$_4$)$_3$.8H$_2$O all have solubilities greater than 21 g/L, allowing for separation from EuSO$_{4(s)}$ by factors between 84 and 840. Conveniently, the reduction and precipitation of the europium can be monitored visually during experiments: Eu$^{3+}$ in chloride solution is colorless, Eu$^{2+}$ is yellow, the EuSO$_4$ solid is a fine white crystal, and Eu$_2$(SO$_4$)$_3$ is light pink.

The quality and yield of the Eu(II)SO$_4$ precipitate is influenced by several factors, including, but not limited to: reduction methods, the reduction medium, europium concentration, sulfate concentration, reaction time, impurities, and temperature. Depending on conditions, a single reduction and precipitation pass can produce EuSO$_4$ yields as high as 99.9%.

Eu$^{3+}$ can be reduced via electrochemical reduction, photoreduction, and, if organics that scavenge oxidizing radiolysis products are present, gamma-ray irradiation. Eu$^{3+}$ reduction can also be accomplished with an amalgamation process that Mel'nik and coworkers named "cementation", where an alkali metal amalgam is used to reduce europium first to the divalent state and then to the metal amalgam, Eu$^0$(Hg). Various metals and metal amalgams (e.g. magnesium, sodium, and europium), as well as metal hydrides and nitrogenous reductants, have been tested for Eu$^{3+}$ reduction. Metallic zinc and metal amalgams show superior results (greater than 99.7% EuSO$_4$ precipitation) over the nitrogenous and metal hydride reductants (0% EuSO$_4$ precipitation). The efficiency of zinc metal and zinc amalgam methods make them two of the most common Eu$^{3+}$ reduction methods, either in batch or column form. The governing electrochemical equations are shown in equations (2) and (3).

$$2\text{Eu}^{3+}+2e^-\rightarrow 2\text{Eu}^{2+} \quad E°=-0.36\text{ V} \qquad (2a)$$

$$\text{Zn}^0\rightarrow\text{Zn}^{2+}+2e^- \quad E°=0.7618\text{ V} \qquad (2b)$$

$$Zn(Hg) \rightarrow Zn^{2+} + 2e^- \quad E° = 0.7628 \text{ V} \tag{2c}$$

$$2Eu^{3+}_{(aq)} + Zn^0_{(s)} \rightarrow 2Eu^{2+}_{(aq)} + Zn^{2+}_{(aq)} \quad E° = 0.4018 \text{ V} \tag{3a}$$

$$2Eu^{3+}_{(aq)} + Zn(Hg)_{(s)} \rightarrow 2Eu^{2+}_{(aq)} + Zn^{2+}_{(aq)} \quad E° = 0.4018 \text{ V} \tag{3b}$$

A zinc-based reductor column is mechanically the simplest reduction method to implement in a radiological hot cell environment. No electrochemical cells or electrodes are needed and, in the column form, no filtration of the zinc metal from the lanthanide solution is necessary.

Although the zinc reduction method is simple and straightforward mechanically, it can have chemical products that present unacceptable hazards in a hot cell environment. As shown in equations (4) and (5), the use of metallic zinc in an aqueous environment generates vigorous hydrogen production and bubbling stemming from the redox reaction of the metallic zinc and hydrated protons in solution.

$$Zn^0 \rightarrow Zn^{2+} + 2e^- \quad E° = 0.7618 \text{ V} \tag{4a}$$

$$2H^+ + 2e^- \rightarrow H_2 \quad E° = 0.00 \text{ V} \tag{4b}$$

$$Zn^0_{(s)} + 2H_3O^+ \rightarrow Zn^{2+} + H_{2(g)} + H_2O \quad E° = 0.7618 \text{ V} \tag{5}$$

If used in a column, the hydrogen gas bubbles produced in equation (5) can isolate the europium solution from the zinc surface, preventing full reduction. The hydrogen gas production also creates a significant fire hazard and, as such, is not permitted within radioactive hot cells. One alternative to europium reduction in acidic solutions is to use basic solutions, but this is impractical, as rare earth hydroxides are very insoluble. Using zinc amalgam prevents hydrogen generation in aqueous solutions, but creates a mixed mercury-radioactive waste that is difficult and costly to dispose of.

With a redox potential $E°(III/II) = -0.36$, $Eu^{2+}$ is very easily oxidized to $Eu^{3+}$. Exposure to atmospheric oxygen will oxidize $Eu^{2+}$, via the following reaction:

$$2Eu^{2+} \rightarrow 2Eu^{3+} + 2e^- \quad E° = 0.36 \text{ V} \tag{6a}$$

$$\tfrac{1}{2}O_2 + H_2O + 2e^- \rightarrow 2OH^- \quad E° = 0.401 \text{ V} \tag{6b}$$

$$2Eu^{2+}_{(aq)} + \tfrac{1}{2}O_2 + H_2O \rightarrow 2Eu^{3+}_{(aq)} + 2OH^- \quad E° = 0.761 \text{ V} \tag{7}$$

$EuSO_4$ precipitations are preferably performed under an inert cover gas. Reduction effectiveness and stability also depend on the solvent and background electrolytes. A water based solvent will cause some oxidation of $Eu^{2+}$ in combination with light:

$$Eu^{2+} \rightarrow Eu^{3+} + e^- \quad E° = 0.36 \text{ V} \tag{8a}$$

$$H_2O + e^- \rightarrow OH^- + \tfrac{1}{2}H_2 \quad E° = -0.8277 \text{ V} \tag{8b}$$

$$Eu^{2+} + H_2O^{hv} \rightarrow Eu^{3+} + OH^- + \tfrac{1}{2}H_2 \quad E° = -0.4677 \tag{9}$$

Even though the value of E° for equation (9) is negative, and therefore not spontaneous from left to right, the addition of light provides the energy needed to allow excess hydrated protons to oxidize $Eu^{2+}$. The presence of hydrated protons also encourages oxidation from $Eu^{2+}$ to $Eu^{3+}$, shown in equations (10) and (11).

$$Eu^{2+} \rightarrow Eu^{3+} + e^- \quad E° = 0.36 \text{ V} \tag{10a}$$

$$2H^+ + 2e^- \rightarrow H_2 \quad E° = 0.00 \text{ V} \tag{10b}$$

$$Eu^{2+} H_3O^+ \rightarrow Eu^{3+} + H_2O + \tfrac{1}{2}H_2 \quad E° = 0.36 \text{ V} \tag{11}$$

In general, background electrolytes with strong oxidizers, such as $HNO_3$, must be avoided.

Europium concentration has a significant influence on reduction efficiency. Europium can be maintained in the reduced state for at least 10 to 15 minutes when it is present in concentrations above 10 mM. At tracer levels (~$10^{-10}$ M), oxygen scavengers are typically necessary to maintain the divalent oxidation state. Prior art experiments to determine the effects of process conditions on the recovery and punt of precipitated $EuSO_4$ from a rare earth concentrate containing neodymium, samarium, europium, gadolinium, and terbium. In studies using 0.1 g of europium and 0.02 moles of $H_2SO_4$ as the sulfate source, a three-fold stoichiometric excess of zinc metal was required to obtain the maximum reduction and recovery of $EuSO_4$, but the stoichiometric amount of zinc appeared to have no effect on $EuSO_4$ purity. $Eu^{2+}$ recovery increased with sulfate concentration until a stoichiometric ratio of 1:3 ($Eu^{2+}:SO_4^{2-}$) was reached, above which the europium purity dropped precipitously due to the precipitation of other Ln(III) sulfates. The sulfate must also be added after the europium has been reduced by a zinc column, or $EuSO_4$ will precipitate on the column and possibly restrict column flow.

Reduction experiments using europium, zinc, $H_2SO_4$, and a batch testing method needed 60 to 90 minutes to reach maximum europium reduction and 60 to 90 minutes after the sulfate addition for maximum $EuSO_4$ yield. Precipitation of $EuSO_4$ from solution with significant amounts of other elements (such as dissolved ores that contain rare earths and iron) demonstrates reduction kinetics that are about three times slower than solutions containing only rare earths. Another study found that the purity and yield of the europium (II) sulfate vas improved when the sulfate was added at 1 mL/minute or less. The slower addition keeps the sulfate concentration lower at all times, preventing saturation conditions that can cause the precipitation of unwanted trivalent lanthanide sulfates. Additional gadolinium purification strikes fall into three categories: removal of the remaining ~1% of the europium, removal of dissolved zinc, and removal of unwanted anions (e.g. $SO_4^{2-}$) from solution.

A number of techniques have been used to remove the remaining europium from solution. Bray and Corneillie countered the difficulty of reducing and precipitating the small amount of europium left after the first strike by adding a reducible quantity of stable europium and repeating the reduction-precipitation reaction. This technique successfully removes much of the remaining radioactive europium, but it may also lower the overall gadolinium yield via co-precipitation.

Other common secondary europium strikes include reduction of europium followed by liquid-liquid extraction with organic solvents such as HDEHP, HEH(EHP), TTA, etc., and/or ion exchange Chromatography using resin beads impregnated with the aforementioned solvents. Ion exchange chromatography using a variety of complexants that exploit the $Eu^{2+}/Eu^{3+}$ charge difference has also been reported. Using long, pressurized ion exchange columns to exploit the lanthanide contraction is also possible, and provides a good separation for non-adjacent lanthanides like gadolinium and samarium, but stronger overlap for adjacent lanthanides like europium and gadolinium.

Zinc removal from gadolinium solutions is typically achieved via solvent extraction or precipitation of ZnS with $H_2S_{(g)}$. Solvent extraction of zinc with Cyanex 925, a commercial phosphine oxide, has been reported to strip 99% of the aqueous zinc after five counter-current stages without the loss of rare earths. Removal of zinc from aqueous solution with hydrogen sulfide gas is a classic chemical method, shown in equation (12a). The Kspa for ZnS is $3 \times 10^{-2}$ or $2\times10^{-4}$, depending on the solid phase, which gives a maximum ZnS solubility above pH 2 of 0.17 g/L. Because ZnS is soluble if the pH is less than two, some amount of a soluble base must be added with the $H_2S_{(g)}$ to counter the hydrochloric acid produced by the precipitation of ZnS (equation 12b).

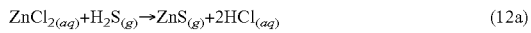  (12a)

  (12b)

The final purification step after all of the non-gadolinium rare earths and the zinc have been removed is to exchange unwanted anions in solution (e.g. leftover $SO_4^{2-}$) for the anion used in the final gadolinium product (e.g. $Cl^-$ or $NO_3^-$). A standard chloride-form or nitrate-form anion exchange column is typically utilized for this step While various attempts have been made to address the issues none have been completely successful. In some industrial processes, samarium and terbium impurities (products of that particular neutron irradiation scheme) are removed by HDEHP-nitric acid extraction chromatography and non-radioactive impurities are removed by cation exchange. The purified $^{153}$Gd is twice precipitated as $Gd_2(C_2O_4)_3$ and converted to $Gd_2O_3$. The gadolinium oxide is dissolved in 4 M nitric acid and heated to form a moist salt. The international producers report a $^{153}$Gd radiochemical purity of 99.997% (radiological contaminants are $2.8527\times10^{-3}\%$ $^{151}$Gd, $4.9\times 10^{-6}\%$ $^{152}$Eu, and $5.1\times10^{-6}\%$ $^{154}$Eu) and a specific activity of 73.79 Ci/g. What is needed therefore is an improved process that eliminates and/or reduces both the hazardous mercury and dangerous hydrogen gas generation. The present invention meets these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is an alteration of the traditional zinc/zinc-amalgam reduction procedure which eliminates both the hazardous mercury and dangerous hydrogen gas generation. In order to avoid the presence of water and hydrated protons in the working solution, which can oxidize $Eu^{2+}$ and cause hydrogen gas production, a process utilizing methanol as the process solvent is described. While methanol presents some flammability hazard in a radiological hot cell, it can be better managed and is less of a flammability hazard than hydrogen gas.

In one embodiment of the invention the purification of lanthanide elements is obtained by irradiating a target with neutrons for a preselected time to form a desired lanthanide in the target; dissolving the irradiated in a strong acid to form a solution; heating the solution to remove residual acid and form a hydrated salt; dissolving the hydrated salt in dry methanol to form a methanol solution; treating said methanol solution with zinc for a preselect time; adding sulfate [$SO_4^{2-}$] to form a precipitate; removing said precipitate to create a liquid filtrate solution; and finally collecting the desired lanthanide from the solution by cation exchange.

In one specific application a method for purification of $^{153}$Gd is described which is characterized by the steps of dissolving a hydrated europium salt in dry methanol to form a dry solution, reducing the [$Eu^{3+}$] ions to form [$Eu^{2+}$] ions while retaining [$^{153}$Gd] ion in the (3+) state in the methanol solution, collecting the methanol-europium solution in water, precipitating [$Eu^{2+}$] ions as $EuSO_4$, filtering to obtain a filtrate liquid containing the [$^{153}$Gd] ion in the (3+) state in the methanol-water solution; and purifying the $^{153}$Gd solution to recover same at a yield greater than 90% $^{153}$Gd.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIG. 1 is a schematic view of the process of the present invention.

DETAILED DESCRIPTION OF THE INVENTION

The following description includes a preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is intention to limit the invention to the specific form disclosed, but, on the contrary, the invention is to cover all modifications, alternative constructions, and equivalents falling within the spirit and scope of the invention as defined in the claims.

The improved europium precipitation and gadolinium purification process is outlined in the schematic in FIG. 1. The target referred to in the next several paragraphs is the starting material, irradiated with neutrons in a reactor. In this process, the lanthanide oxides, the composition of the target material, dissolve easily in concentrated hydrochloric acid with gentle warming (distillation equipment will be used to capture HCl and prevent corrosion of stainless steel hot cell walls). Further heating evaporates residual HCl and leaves the hydrated $EuCl_3 \cdot 6H_2O$ salt, which is extremely soluble in methanol. The $EuCl_3 \cdot 6H_2O$ is dissolved in a small volume of methanol to make a load solution. The quantity of methanol is about 10 mL for a 0.5-gram irradiated europium target.

Alternatively, the irradiated lanthanide target is dissolved in another volatile acid, such as nitric acid, then evaporated dry in the hot cell air. Nitric acid does not corrode stainless steel and therefore does not corrode the inside of the hot cell. The use of nitric acid permits the initial target dissolution to be done in stainless steel equipment rather than glass. After the target solution has been evaporated dry from nitric acid, it is dissolved in hydrochloric acid, transferred to another vessel as appropriate (something not made of stainless steel), and evaporated dry three times with hydrochloric acid to convert the nitrate salts to chloride salts. The dry chloride salts are dissolved in 10 mL of dry methanol to make a load solution.

The load solution with the dissolved, irradiated target is loaded onto the zinc reductor column. The column of granulated zinc is approximately 15 cm tall and has an interstitial volume of about 10 mL. The solution is allowed to flow at a rate of one milliliter per minute to ensure adequate contact time between the europium in solution and the particles of metallic zinc. As in the aqueous process, the methanol column effluent is a clear yellow solution characteristic of $Eu^{2+}$. After the load solution has passed through the zinc column, the column is rinsed three times with 10 milliliters of methanol apiece to ensure that all of the load solution has washed through the column.

As the load solution passes through the zinc column, the $EuCl_3$ is reduced by the zinc to $EuCl_2$, which remains in solution in the methanol. However, the small amount of gadolinium in the target solution precipitates on the zinc column. The majority of the gadolinium remains in the zinc column, while nearly all the europium passes through.

The methanol solution of $EuCl_2$ is collected, as it exits the zinc column, in a flask containing 100 mL of water, under nitrogen cover gas. Roughly 25% of the gadolinium originally present in the target solution collects in the flask; the other 75% remains on the zinc column.

A solution with a 1.5× stoichiometric excess (with respect to europium content) of $H_2SO_4$ in 100 mL of water is sparged with nitrogen gas to remove dissolved oxygen, then added to the $Eu^{2+}$ solution over a period of about 10 minutes. During the addition, the solution is stirred well to avoid formation of hyper-concentrated areas within the solution that can cause precipitation of $Gd_2(SO_4)_3$ along with the $EuSO_4$. As the sulfate mixture is added, the solution begins to cloud with the white $EuSO_4$ precipitate. The water present in this process is necessary to keep all the lanthanides except europium in solution. After addition of the sulfuric acid solution is complete, the solution is allowed to stand with gentle stirring for 5 minutes. The mixture is then filtered, producing a clear, colorless solution. The flask and filter are rinsed with about 30 mL of a very dilute solution of sulfuric acid (previously sparged with nitrogen to remove dissolved oxygen) to sweep residual precipitate onto the filter and recover other dissolved lanthanides.

The clear filtrate has a chemical composition of about 20% methanol, 80% water, a modest amount of dissolved $ZnCl_2$, sulfuric acid, and the other lanthanides. Between 0.1% and 1.0% of the europium will still be in solution; the balance will be on the filter cake in the form $EuSO_4$.

After the $EuSO_4$ has been removed from solution by filtration, the filter with its filter cake of $EuSO_4$ is removed from the process equipment and replaced with a clean filter. (The $EuSO_4$ filter cake is placed in a shielded storage location.) Thirty mL of a 1% solution of $Na_2EDTA$ in water is added to the zinc column to dissolve the gadolinium sticking to the zinc. As the $Na_2EDTA$ solution passes through the zinc column, it dissolves and recovers the gadolinium and any other lanthanides from the zinc column. The $Na_2EDTA$ solution, with gadolinium, collects in the flask below the zinc column. After the $Na_2EDTA$. solution has cleared the zinc column, the zinc column is rinsed with 10 mL of water. Finally, the $Na_2EDTA$ solution is drawn through the filter and combined with the previous filtrate.

The $EuSO_4$ precipitation is known to coprecipitate some fraction of the gadolinium and other trivalent lanthanides, reducing the gadolinium yield. Such coprecipitation is largely avoided by leaving the gadolinium mostly on the zinc column while the europium is precipitated and removed from solution by filtration. The gadolinium is recovered from the zinc column only after the $EuSO_4$ precipitation is complete and the europium has been removed from the process equipment.

The combined filtrate has about 40 mL of methanol, 270 mL of water (including rinses), a small amount of $Na_2EDTA$, a moderate amount of $ZnCl_2$, a small amount of $H_2SO_4$, and nearly all of the gadolinium and other lanthanides originally present in the original target. As much as 1% of the europium in still be present. The lanthanides are recovered from this solution by any of several methods. One method is collection on cation exchange resin, as follows: The combined filtrate is made approximately 0.1M in HCl by adding about 3 mL of concentrated HCl and stirring, and then the solution is passed through a 10-mL bed of strong acid cation exchanger, such as Dowex 50W-X8, 50-100 mesh, hydrogen form resin. The lanthanides load strongly onto the resin, but methanol and sulfate pass through. After all of the solution has passed through the resin, the column effluent is discarded. Twenty mL of 2M HCl is then passed through the column to remove some of the zinc, and the column effluent is discarded. A clean collection container is placed under the column, and 250 mL of 6M HCl is passed through the column. The 6M HCl strips the lanthanides from the resin, and the lanthanides appear in the clean container under the column, dissolved in the 6M HCl colt in effluent. The 6M HCl column effluent is evaporated dry. The dry product has nearly all of the lanthanides and part of the zinc, but no sulfate. This concludes one strike of the europium removal process.

The europium removal process can be repeated for further decontamination. To repeat the process, a europium carrier of stable europium (0.5 gram of Eu, equivalent to about 1.2 g of $EuCl_3.6H_2O$) is added to the product and evaporated dry with a small volume of HCl. The mixture is dissolved in methanol as before, and the process is run again, as before.

In our testing, each strike of the europium removal process has been shown to remove between 99% and 99.9% of the europium. Gadolinium recovery is better than 90%. Most of the observed gadolinium loss is in the cation exchange step, not the europium sulfate precipitation. Actual decontamination will probably be less than what is theoretically attainable because of recontamination of the product with traces of the starting material, something hard to avoid in a hot cell. Two strikes of the process will give overall europium decontamination between $10^3$ and $10^5$.

After completion of one or more strikes of the $EuSO_4$ precipitation described here, the product dose rate will be only a fraction of that of the starting material, and any of several literature methods for lanthanide separations can be used for further purification.

Natural europium is 47.8% $^{151}Eu$ and 52.2% $^{153}Eu$. $^{153}Gd$ is produced via the following reaction:

$$^{151}Eu^{(n,\gamma)} \rightarrow {}^{152}Eu^{(\beta-)} \rightarrow {}^{152}Gd^{(n,\gamma)} \rightarrow {}^{153}Gd \tag{1}$$

$^{153}Gd$ has a very high capture cross-section for epithermal neutrons, meaning that as $^{153}Gd$ is produced from $^{152}Gd$, some $^{153}Gd$ also being lost to neutron capture reactions. The amount of $^{153}Gd$ that can be produced in a given sample over time has a maximum, after which additional irradiation time is detrimental to the $^{153}Gd$ yield.

The mass fraction of $^{153}Gd$ in an irradiated, natural europium target is small, on the order of 0.02 to 0.1, depending on the neutron flux and irradiation time. $^{153}Gd$ also contributes little radioactive dose compared to the radioactive europium isotopes ($^{152}Eu$, $^{154}Eu$, and $^{155}Eu$) that are created during target irradiation. Samarium, promethium, and terbium may also be produced in milligram quantities with low activities, depending on the neutron spectrum.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for purifying lanthanide elements, comprising the steps of:
    irradiating a europium-containing target with neutron irradiation for a preselected time to form a desired lanthanide in the irradiated target;
    dissolving the irradiated target in a strong acid to form a solution;
    heating the solution to remove the acid and form a hydrated salt of the irradiated target;
    dissolving the hydrated salt of the irradiated target in dry methanol to form a methanol solution;
    treating the methanol solution containing the target material with zinc for a preselected time to reduce the oxidation state of the irradiated target;
    adding sulfate [$SO_4^{2-}$] to form a precipitate containing the irradiated target;
    removing the precipitate from the methanol solution to create a liquid filtrate containing the desired lanthanide; and
    recovering the desired lanthanide from the liquid filtrate by cation exchange.

2. A method for purification of $^{153}$Gd, characterized by the steps of:
    dissolving a neutron irradiated europium-containing target in a strong acid to form a solution;
    heating the solution to remove the acid and form a hydrated salt of the irradiated europium-containing target;
    dissolving the hydrated europium salt obtained from the irradiated europium-containing target in dry methanol to form a dry solution;
    reducing the [$Eu^{3+}$] ions to form [$Eu^{2+}$] ions while retaining [$^{153}$Gd] ion in the (3$^+$) state in the methanol solution;
    precipitating [$Eu^{2+}$] ions as a $EuSO_4$ salt to obtain a filtrate liquid containing the [$^{153}$Gd] ion in the (3$^+$) state in the methanol solution; and
    purifying the $^{153}$Gd solution to recover $^{153}$Gd at a yield greater than 95% $^{153}$Gd.

3. A method for purification of $^{153}$Gd, comprising the steps of:
    irradiating a europium oxide target with neutron irradiation for a preselected time to form $^{153}$Gd in the target;
    dissolving the irradiated europium oxide target containing $^{153}$Gd in a strong acid to form a europium solution;
    heating the dissolved europium oxide solution to remove residual acid and form a hydrated europium salt;
    dissolving the hydrated europium salt in dry methanol;
    reducing europium in the methanol solution from [$Eu^{3+}$] to [$Eu^{2+}$] by contacting the europium with zinc for a preselected time;
    leaving gadolinium on the zinc column, while the europium passes through with the methanol solution in the [$Eu^{2+}$] state;
    precipitating the europium [$Eu^{2+}$] by addition of sulfate [$SO_4^{2-}$] to form a $EuSO_4$ salt and separating the $EuSO_4$ salt, yielding a liquid filtrate containing $^{153}$Gd;
    recovering the gadolinium from the zinc column by passing a complexing agent through the zinc column;
    acidifying the liquid filtrate with HCl and passing it through a cation exchanger to collect the $^{153}$Gd on the cation exchanger, thereby separating the $^{153}$Gd from methanol, sulfate, and zinc; and
    stripping the $^{153}$Gd from the cation exchanger with 6M HCl and then evaporating the 6M HCl to dryness.

4. The method of claim 1, wherein the lanthanide is gadolinium-153 ($^{153}$Gd).

* * * * *

UNITED STATES PATENT AND TRADEMARK OFFICE
CERTIFICATE OF CORRECTION

PATENT NO. : 8,425,654 B2
APPLICATION NO. : 13/212711
DATED : April 23, 2013
INVENTOR(S) : Johnsen Page 1 of 1

It is certified that error appears in the above-identified patent and that said Letters Patent is hereby corrected as shown below:

In the Specification

Column 1, Line 7: Replace "punt" with "purity"

Column 1, Line 67: Replace "wails" with "walls"

Column 4, Line 4: Replace "vas" with "was"

Column 7, Line 7: Replace "in" with "may"

Column 8, Line 16: Replace "colt in" with "column"

Signed and Sealed this
Seventh Day of January, 2014

Margaret A. Focarino
*Commissioner for Patents of the United States Patent and Trademark Office*